(12) United States Patent
Golander et al.

(10) Patent No.: US 8,850,095 B2
(45) Date of Patent: Sep. 30, 2014

(54) LIVELOCK PREVENTION MECHANISM IN A RING SHAPED INTERCONNECT UTILIZING ROUND ROBIN SAMPLING

(75) Inventors: Amit Golander, Tel-Aviv (IL); Omer Heymann, Tel-Aviv (IL); Nadav Levison, Tel-Aviv (IL); Eric F. Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 13/023,141

(22) Filed: Feb. 8, 2011

(65) Prior Publication Data

US 2012/0203946 A1  Aug. 9, 2012

(51) Int. Cl.
*G06F 13/00* (2006.01)
*G06F 15/16* (2006.01)

(52) U.S. Cl.
CPC ........................................ *G06F 13/00* (2013.01)
USPC ........................................ 710/111; 709/234

(58) Field of Classification Search
USPC ........................................ 710/111; 709/234
See application file for complete search history.

(56) References Cited

U.S. PATENT DOCUMENTS

| | | | |
|---|---|---|---|
| 6,108,739 A | 8/2000 | James et al. | |
| 6,647,453 B1 | 11/2003 | Duncan et al. | |
| 6,799,219 B1 | 9/2004 | Sugahara et al. | |
| 7,006,501 B1 | 2/2006 | Gura et al. | |
| 7,277,443 B2 * | 10/2007 | Goode et al. | 370/400 |
| 7,350,002 B2 * | 3/2008 | Ahmed | 710/108 |
| 7,733,898 B2 * | 6/2010 | Mattina et al. | 370/460 |
| 7,760,669 B2 | 7/2010 | Heil et al. | |
| 2003/0212812 A1 * | 11/2003 | Wang et al. | 709/234 |
| 2007/0118837 A1 | 5/2007 | Doing et al. | |
| 2011/0197002 A1 * | 8/2011 | Deng et al. | 710/110 |

OTHER PUBLICATIONS

Mark Karol et al., "Prevention of Deadlocks and Livelocks in Lossless Backpressured Packet Networks," IEEE/ACM Transactions on Networking, vol. 11, No. 6, Dec. 2003.

* cited by examiner

*Primary Examiner* — Paul R Myers
*Assistant Examiner* — Christopher A Daley
(74) *Attorney, Agent, or Firm* — International IP Law Group, PLLC (57) ABSTRACT

A novel and useful cost effective mechanism for detecting the livelock/starvation of transactions in a ring shaped interconnect that utilizes minimal logic resources. Rather than monitor all transactions concurrently in the ring, the mechanism monitors only a single transaction in the ring. A sampling point is located at a point in the ring which contains a set of N latches. If the monitored transaction is not being starved, it is released and the detection logic moves on the next candidate transaction in round robin fashion. If the monitored transaction passes the sampling point a threshold number of times, it is deemed to be starved and a starvation prevention handling procedure is activated. By traversing the entire ring a single transaction at a time, all starving transactions will eventually be detected with an upper limit on the detection time of $O(N^2)$.

24 Claims, 5 Drawing Sheets

LIVELOCK PREVENTION MECHANISM IN A RING SHAPED INTERCONNECT UTILIZING ROUND ROBIN SAMPLING

FIELD OF THE INVENTION

The present invention relates to the field of data communications, and more particularly relates to a cost effective mechanism of preventing livelock (or starvation) of transactions in a ring shaped interconnect using round robin sampling.

SUMMARY OF THE INVENTION

There is thus provided in accordance with the invention, a method of livelock prevention for use in an N-stage ring shaped interconnect, the method comprising the steps of sampling a single candidate transaction at a sample point in the ring after it has looped at least once around the ring and if the candidate transaction continues to loop around the ring a configurable (or predetermined) number of times at the sampling point, then flagging the candidate transaction as a starvation transaction. Note that the term flagging is intended to indicate the recording of the identification information of the transaction so it can be identified when it comes around the ring.

There is also provided in accordance with the invention, a method of livelock prevention for use in an N-stage ring shaped interconnect, the method comprising the steps of sampling a single candidate transaction in the ring, monitoring the candidate transaction for recurring looping thereof at a sampling point, if the candidate transaction loops around the ring a configurable number of times, flagging the candidate transaction as a starvation transaction and otherwise, releasing the candidate transaction if it reaches its target before looping around the ring the configurable number of times and sampling a next candidate transaction in the ring in round robin fashion.

There is further provided in accordance with the invention, an apparatus for preventing livelock for use in an N-stage ring shaped interconnect, the method comprising the steps of a sampler operative to sample a single candidate transaction at a sample point in the ring after it has looped at least once around the ring and a flagging circuit operative to flag the candidate transaction as a starvation transaction if the candidate transaction continues to loop around the ring a configurable number of times at the sampling point.

There is also provided in accordance with the invention, an apparatus for preventing livelock for use in an N-stage ring shaped interconnect, the method comprising the steps of a sampler operative to sample a single candidate transaction in the ring, a monitor operative to monitor the candidate transaction for recurring looping thereof at a sampling point, a flagging circuit operative to flag the candidate transaction as a starvation transaction if the candidate transaction loops around the ring a predetermined number of times and a release circuit operative to otherwise release the candidate transaction if it reaches its target before looping around the ring the predetermined number of times and to sample a next candidate transaction in the ring in round robin fashion.

BRIEF DESCRIPTION OF THE DRAWINGS

The invention is herein described, by way of example only, with reference to the accompanying drawings, wherein.

DETAILED DESCRIPTION OF THE INVENTION

Figure 1:
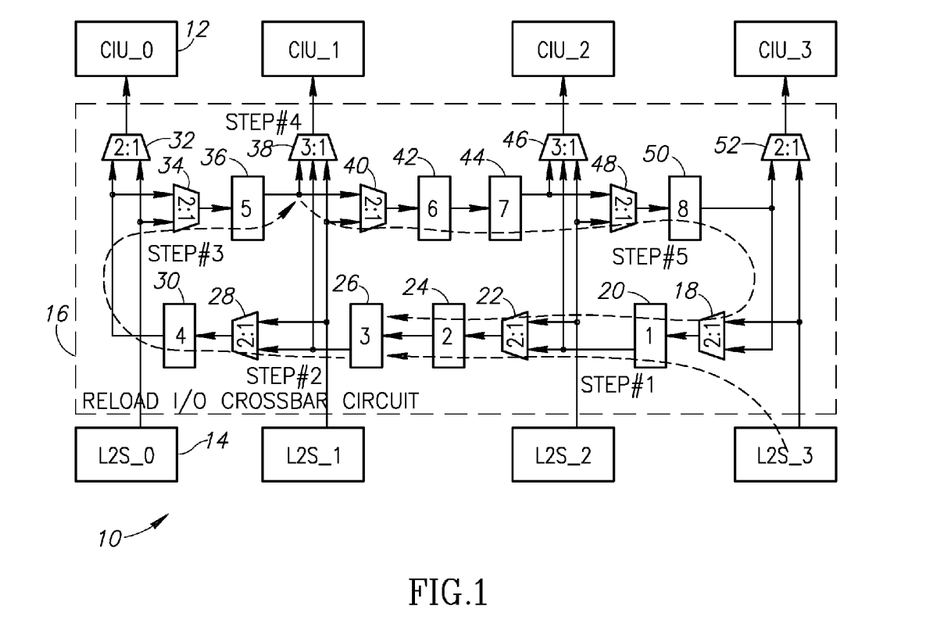
FIG. 1 is a block diagram illustrating an example transaction flow in a ring shaped interconnect.

A block diagram illustrating an example transaction flow in a ring shaped interconnect is shown in FIG. 1. For illustration purposes only, the livelock prevent mechanism is described in the context of a 4×4 crossbar reload interface interconnect incorporated in a computer processing device such as a network processor, microprocessor, etc. and comprises a plurality of CPU cores, main memory including L1 and L2 memory caches. In particular, the circuit, generally referenced 10, comprises a plurality of CPU cores (and core interfaces) 12, a plurality of L2 caches 14 and a reload 10 crossbar interconnect circuit 16. The interconnect circuit 16 comprises multiplexers 18, 22, 28, 32, 34, 40, 48, 52 and latches (registers) 20, 24, 26, 30, 36, 42, 44, 50. In this example, the interconnect comprises four L2 cache sections, four CPU cores and interfaces and a number of latches N equal to 8 (latches labeled 1 through 8) forming the interconnect ring.

The cross-bar interconnect is constructed to support concurrent transaction streams from the plurality of L2 slices to all CPU cores. Such concurrent streams, however, can create collisions in the event more than one L2 slice attempts to access the same crossbar output port toward a specific core. In such a case one stream gets priority over the other stream. Transactions which make it into the crossbar but are denied access to their target core output port must retry access at a later time. The ring shaped interface shown in FIG. 1 is used which allows transactions to circle within the ring and re-attempt accessing their target core the next time they encounter it in the ring. Note that the ring based interconnect 16 is also referred to as a decentralized arbitration mechanism which allows each intersection within the interconnect to make local decisions without having to relay on centralized arbitration logic.

The ring shaped interconnect illustrated in FIG. 1 supports streams from four sources (e.g., L2 cache partitions) to four targets (e.g., processor cores). Each of the source streams can target all four targets. The distributed arbitration protocol implemented is such that any transaction in the ring has priority over transactions which want to stream into the ring. The priority of those transactions which have already made it into the ring guaranties that an external stream trying to enter the ring will not prevent a transaction in the ring from reaching its destination. There is an exception to this in case of a multi-beat transaction as exemplified infra.

In general, a protocol is used that determines the priority in case of collision and defines the types of collisions possible (i.e. internal versus internal or internal versus external).

A transaction can be what is referred to as multi-beat. Meaning that, for example, when data is loaded from the L2 back to the L1 the amount of data transferred is greater than what a single transaction can deliver. Therefore, more than one transaction can be part of the same reload request, e.g., up to two transactions. Thus, this is the scenario in which an external transaction might block/collide with in internal one. An external transaction is requesting to enter the ring while there is no internal transaction in the ring with priority that is preventing it from entering. It is therefore allowed to enter the ring following two cycles a second external transaction which is actually the second part of the one which was just allowed to enter the ring is requesting to enter the ring. It is allowed to enter the ring (even if an internal transaction is also asking for the same IO port). Meaning that in case of a second beat of an external transaction it gains priority over a first beat of an internal transaction. Note that the decentralized protocol assures that a case of a second versus second is never encountered.

On the other hand there are two intersections in the ring which bring together two transactions in the ring which might have the same destination and try to exit the ring from the same port at the same cycle. This scenario potentially creates collisions, which allows a transaction to reach its target on one hand but on the other sends a transaction to continue traversing around the ring to make another attempt to reach its destination the next time it has access to the target. A pattern of streams which causes a transaction to encounter repeating collisions and circling around the ring is called starvation.

Depending on the particular conditions, a scenario may arise using such an arbitration scheme in which a specific transaction encounters repeating collisions which prevent it from reaching its destination, thus the transaction keeps circling within the ring. A pattern of transaction streams exist which can potentially cause a transaction to circle around the ring for a relatively long time thus 'starving' it of access to its target CPU or in other words, a livelock occurs. With reference to FIG. 1, a potential collision point exists at the intersection of multiplexers 38 and 40. A second potential collision point exists at the intersection of multiplexers 46 and 48.

In step #1, a transaction from L2S_3 enters the ring with a destination of CIU_1. At step #2, the transaction collides with another transaction with priority at stage 3. At step #3, the transaction continues to loop around the ring to the next ring intersection which allows access to CIU_1. At step #4, the transaction collides with a priority transaction at stage 5. At step #5, the transaction continues to loop around the ring to the next ring intersection with allows access to CIU_1.

Figure 2:
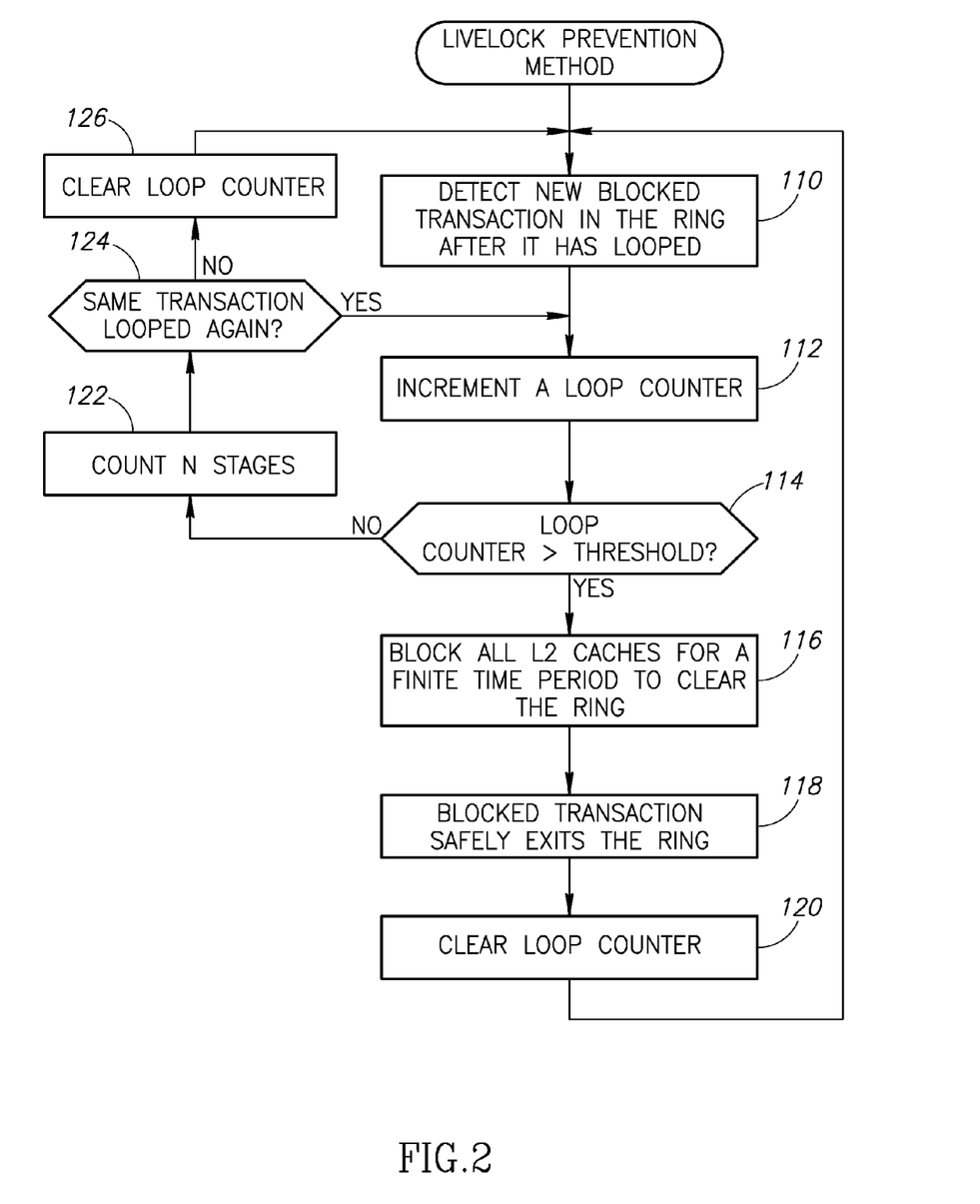
FIG. 2 is a flow diagram illustrating the livelock prevention mechanism of the present invention.

The livelock prevention mechanism of the present invention is activated once such a livelock situation as shown above occurs to prevent further starving. A flow diagram illustrating the livelock prevention mechanism of the present invention is shown in FIG. 2. The mechanism embodied in the flow diagram can be implemented, for example, in a livelock prevention circuit placed at a suitable sampling point in the ring such as between latch stages 8 and 1, as described in more detail infra.

First, the livelock prevention mechanism samples a single transaction (as opposed to multiple transactions) in the ring after it has looped (i.e. encountered a collision or has been blocked from access to its target) (step 110). This transaction is referred to as a candidate transaction, since it is a candidate for designation as a 'starved' transaction. A loop counter is incremented (step 112) and it is checked whether a count threshold has been reached (step 114). If not, the mechanism counts N stages (e.g., 8 in this example) (step 122) and it is then checked whether the same transaction looped around the ring again (step 124). If it did, the loop counter is incremented (step 112) and the method continues. If the same transaction did not loop around the ring again (step 124), then the transaction we previously sampled before has successfully exited the ring and the loop counter is cleared (step 126) and the method continues with step 110.

If the count threshold has been reached (step 114), the candidate transaction is designated a starved transaction and appropriate handling procedure is activated. In the example presented herein, all L2 caches are blocked for a finite time period in order to prevent new transaction traffic from entering the ring (step 116) thus enabling a starvation candidate transaction to become clear from the ring (step 118). The loop counter is then cleared (step 120) and the method returns to step 110. Note that the actions in steps 116 and 118 are typically performed in parallel whereby the state machine implementing the mechanism does not wait for these steps to complete.

An advantage of the livelock prevention mechanism is that is has a logarithmic cost associated with it, which does not scale linearly with the size of the ring (i.e. number of stages). Assuming the ring comprises N stages, the cost of the livelock prevention logic is $O(\log^2 N)$ (i.e. the size of the counter plus a constant). The worst case detection time is $O(N^2)$ which is highly unlikely, with the typical case encountered in real world simulations being O(N). To detect a transaction looping in the ring with a latency of at most O(N), the logic circuitry required increases by an order of N->O(Nlog2N).

The ability to prevent livelocks, even with their occurrence being rare is essential for many systems. On the other hand, however, the cost for providing a very small time to detect blocking in that rare occasion is typically not a justifiable trade-off. Therefore an advantage of the mechanism is its low cost combined with a reasonable detection time for the worst case scenario and a very good detection time for most other cases seen in the real world.

Figure 3:
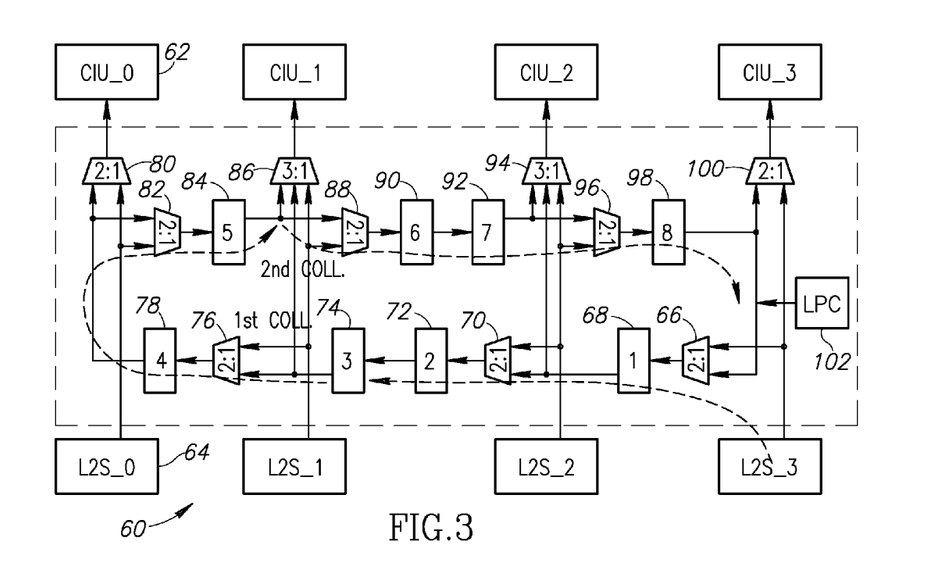
FIG. 3 is a block diagram illustrating a first loop of an example starvation detection in accordance with the mechanism of the present invention.
Figure 4:
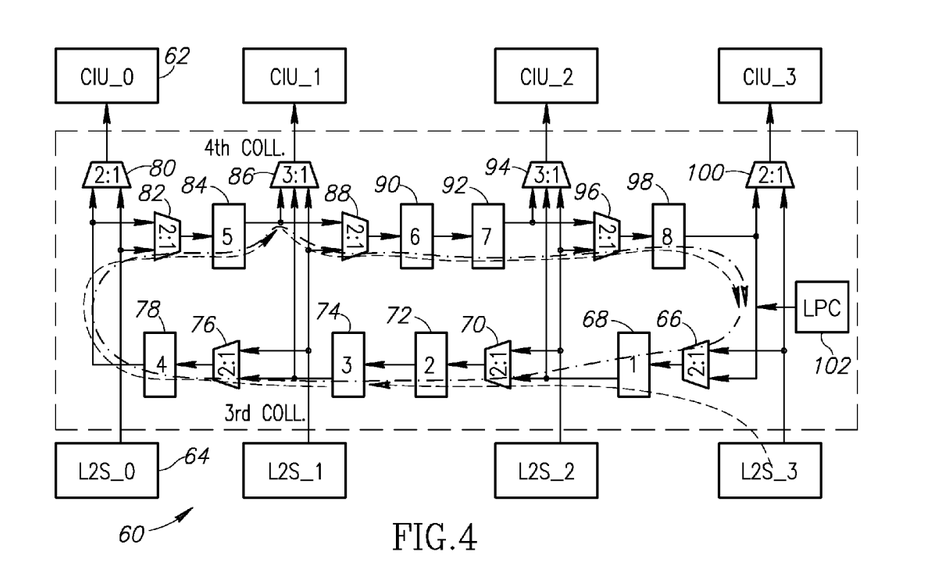
FIG. 4 is a block diagram illustrating a second loop of an example starvation detection in accordance with the mechanism of the present invention.
Figure 5:
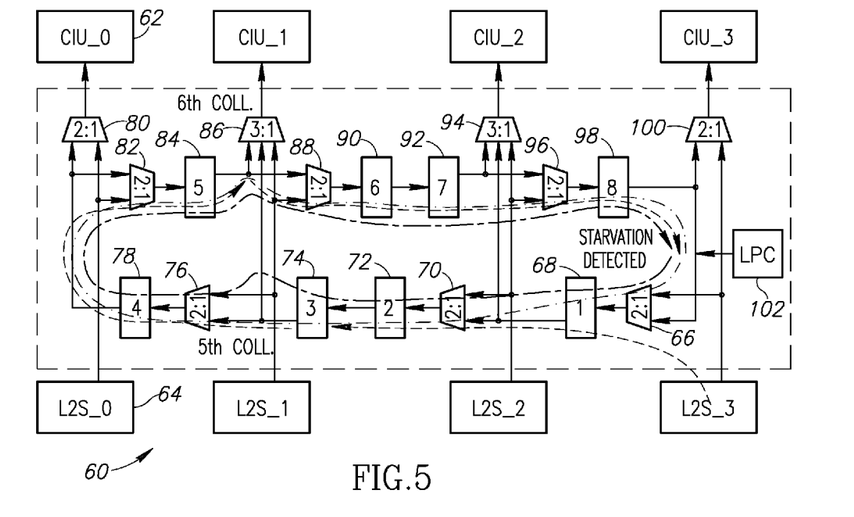
FIG. 5 is a block diagram illustrating a third loop of an example starvation detection in accordance with the mechanism of the present invention.
Figure 6:
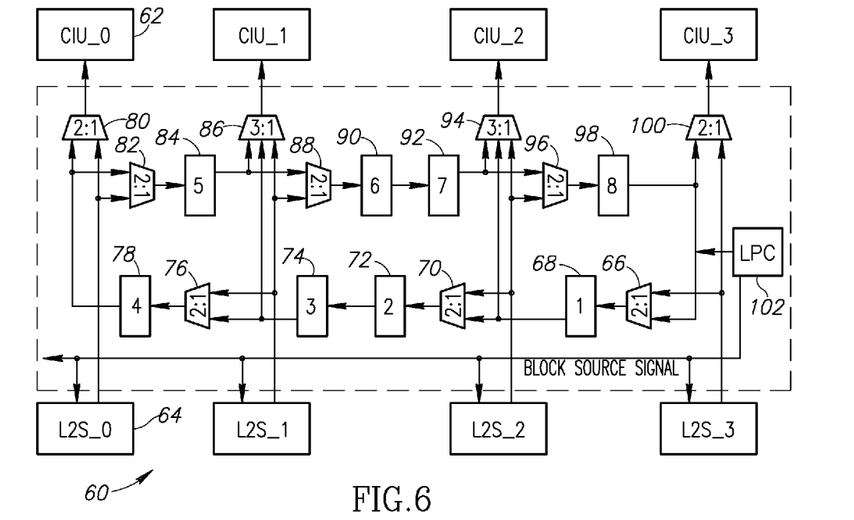
FIG. 6 is a block diagram illustrating an example transaction blocking by the livelock prevention mechanism of the present invention.

To illustrate the principles of the present invention, an illustrative example of a transaction starvation (blocked) is presented. In this example, it is assumed that the threshold for designating a transaction 'starved' is three loops around the ring. In addition, the ring shaped interconnect comprises N=8 latches. FIG. 3 illustrates an example of a transaction flowing through the ring and the different collisions it may encounter. FIGS. 4, 5 and 6 illustrate the three steps of a transaction being identified as potentially starved resulting with the activation of the livelock prevention logic. These are described in more detail infra.

A block diagram illustrating a first loop of an example starvation detection in accordance with the mechanism of the present invention is shown in FIG. 3. For illustration purposes only, the circuit is described in the context of a 4×4 crossbar reload interface interconnect incorporated in a computer processing device such as a network processor, microprocessor, etc. and comprises a plurality of CPU cores, main memory including L1 and L2 memory caches. It is appreciated that other implementations are also possible having a different number of CPU cores, caches and configuration.

In particular, the circuit, generally referenced 60, comprises a plurality of CPU cores (and core interfaces) 62, a plurality of L2 caches 64 and a reload IO crossbar interconnect circuit 66. The interconnect circuit 66 comprises multiplexers 66, 70, 76, 80, 82, 86, 88, 94, 96, 100 and latches (registers) 68, 72, 74, 78, 84, 90, 92, 98. In this example, the interconnect comprises four L2 cache sections, four CPU cores and interfaces and a number of latches N equal to 8 (latches labeled 1 through 8) forming the interconnect ring.

With reference to FIG. 3, the dashed arrow from L2S_3 represents the transaction being sampled for the first time. The transaction is destined to CPU core CIU_1. At stage 3 it encounters a first collision and continues around the ring to stage 5 where it encounters a second collision. At this point the blocked transaction continues around the ring to arrive at the sampling point, i.e. the livelock prevention circuit 102. In accordance with the flow of FIG. 2, the livelock prevention circuit samples the transaction and detects that it is blocked (e.g., valid bit is set). The loop counter is then incremented.

It is thus assumed at this point that there is a starved transaction in the ring, and that it is not the first transaction to be sampled. The mechanism is operative to traverse the ring stage by stage in a round robin fashion until it is captured. A block diagram illustrating a second loop of an example starvation detection in accordance with the mechanism of the present invention is shown in FIG. 4. The transaction begins traversing the ring a second time. During this second loop, it encounters a third collision at stage 3 and a fourth collision at stage 5. The transaction continues traversing around the ring to the sampling point where the loop counter is incremented to '2' by the livelock prevention circuit.

A block diagram illustrating a third loop of an example starvation detection in accordance with the mechanism of the present invention is shown in FIG. 5. The transaction begins traversing the ring a third time. During this third loop, it encounters a fifth collision at stage 3 and a sixth collision at stage 5. The transaction continues traversing around the ring to the sampling point where the loop counter is incremented to '3' by the livelock prevention circuit. At this point, the mechanism compares the value of the loop counter to the threshold (three in this example) and declares the transaction to be starved.

After a starvation transaction is detected, the livelock prevention circuit activates a handling procedure which may perform any suitable action depending on the particular implementation. In the example circuit presented herein, the handling procedure logic propagates a BLOCK SOURCE signal to the L2 caches (i.e. the bottom portion of the ring from right to left). This serves to block new transactions from entering the ring from the memory. The block signal is active long enough to make sure all transactions in the ring safely reach their destination causing the ring to clear, including the starving transaction. Thus the starved transaction finally reaches its target. This is illustrated in FIG. 6 which shows an example transaction blocking by the livelock prevention mechanism of the present invention.

Figure 7:
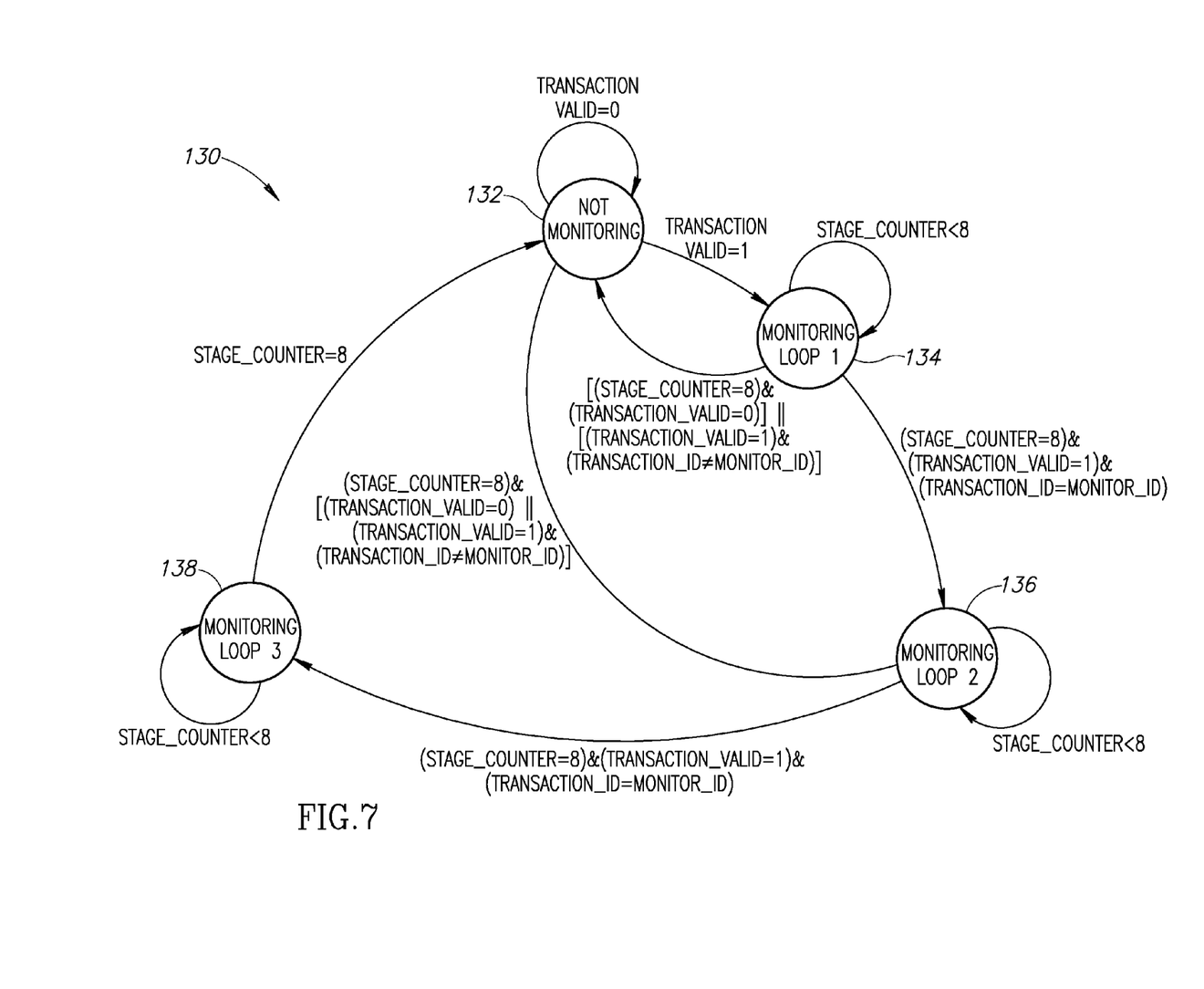
FIG. 7 is a block diagram illustrating an example state machine implementation of the livelock prevention mechanism of the present invention.

A block diagram illustrating an example state machine implementation of the livelock prevention mechanism of the present invention is shown in FIG. 7. The example state machine, generally referenced 130, comprises four states: "not monitoring" 132, "monitoring loop #1" 134, "monitoring loop #2" 136 and "monitoring loop #3" 138.

The not monitoring state is maintained while transaction_valid=0. In this state, the stage_counter=0 and the loop_counter=0. When transaction_valid=1 control moves to state monitoring loop #1 where the stage_counter=1 (and is incremented every cycle) and the loop_counter=1. Control remains in this state while the stage_counter <8 (i.e. for an 8-stage ring). If [stage_counter=8 (i.e. one complete trip around the ring) and transaction_valid=0] OR [transaction_valid=1 and transaction_ID≠monitored_ID], then return to the not monitoring state (i.e. the monitored transaction has left the ring and been delivered to its destination CPU core).

If [stage_counter=8 (i.e. one complete trip around the ring) and transaction_valid=1 and transaction_ID=monitored_ID] then advance to the monitoring loop 2 state. In this state, the stage_counter=1 (i.e. reset and incremented every cycle) and the loop_counter=2. Control remains in this state while the stage_counter <8 (i.e. for an 8-stage ring). If [stage_counter=8 (i.e. one complete trip around the ring) and transaction_valid=0] OR [transaction_valid=1 and transaction_ID # monitored_ID], then return to the not monitoring state (i.e. the monitored transaction has left the ring and been delivered to its destination CPU core).

If [stage_counter=8 (i.e. one complete trip around the ring) and transaction_valid=1 and transaction_ID=monitored_ID] then advance to the monitoring loop 3 state. In this state, the stage_counter=1 (i.e. reset and incremented every cycle) and the loop_counter=3. Control remains in this state while the stage_counter <8 (i.e. for an 8-stage ring). Once [stage_counter=8 and transaction_ID=monitored_ID and transaction_valid=1] than activate the handling procedure whereby (in this example) the starvation prevention logic generates the BLOCK SOURCE signal that is sent to the L2S cache partitions to prevent then from injecting any further transactions into the ring to allow the ring to clear and the starved transaction to reach its destination. The livelock prevention circuit then begins sampling the next transaction in round robin fashion.

As described supra, the livelock prevention circuit samples a transaction in the ring and monitors if a reoccurring looping of this 'starvation candidate' appears. If this transaction reaches it's target before the detection logic encounters it looping three times (in this example) it is released and the detection logic begins samples the next transaction in the ring as the new 'starvation candidate'. Thus, the longest time (i.e. the worst case (WC)) a starving transaction (called a WC Transaction) can loop in the ring is when the first time this transaction collided and looped, the detection logic samples a 'starvation candidate' after it is in the ring. Note that this can occur if it had a first candidate when a second transaction passed the detection logic and just after passing the first candidate is released and a new one is captured). The 'WC Transaction has now looped three times. It can thus take up to N−2 additional starvation candidates before the WC Transaction is sampled and then another three starvation candidates before it is identified as being starved. Therefore the maximal number of loops before a starvation indication is 3*N. This translates to $3*N^2$ cycles. Thus the worst case performance of the livelock prevention mechanism is $O(N^2)$.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of livelock prevention for use in an N-stage ring shaped interconnect, said method comprising:
    injecting one or more transactions into said ring;
    sampling a single injected candidate transaction at a sample point in said ring after it has looped at least once around said ring;
    defining a starvation transaction as an injected transaction that has looped a predetermined threshold of times around the ring; and
    if said injected candidate transaction is a starvation transaction as defined, then flagging said injected candidate transaction as a starvation transaction.

2. The method according to claim 1, further comprising the step of activating a livelock handling procedure if said injected candidate transaction continues to loop around said ring at least meeting the predetermined threshold at said sampling point.

3. The method according to claim 2, wherein activating a livelock handling procedure comprises blocking transactions from entering said ring until said starvation transaction safely exits said ring.

4. The method according to claim 1, further comprising clearing the current injected candidate transaction and sampling a next candidate transaction in round robin fashion if said injected candidate transaction ceases to be a starved transaction.

5. The method according to claim 1, further comprising clearing the injected candidate transaction and sampling a next candidate transaction in round robin fashion if after N-stages said injected candidate transaction has not reached said sampling point.

6. The method according to claim 1, further comprising continuing to sample injected candidate transactions in said ring in round robin fashion until all starving transactions are detected.

7. A method of livelock prevention for use in an N-stage ring shaped interconnect, said method comprising:
- injecting one or more transactions into said ring;
- sampling a single injected candidate transaction in said ring;
- monitoring said candidate transaction for recurring looping thereof at a sampling point;
- defining a starvation transaction as an injected transaction that has looped a predetermined threshold of times around the ring;
- if said injected candidate transaction is a starvation transaction as defined, flagging said injected candidate transaction as a starvation transaction; and
- otherwise, releasing said injected candidate transaction if it reaches a target before meeting the predetermined threshold, and sampling a next candidate transaction in said ring in round robin fashion.

8. The method according to claim 7, further comprising activating a livelock handling procedure if said injected candidate transaction continues to loop around said ring at least meeting the predetermined threshold at said sampling point.

9. The method according to claim 8, wherein activating a livelock handling procedure comprises the step of blocking transactions from entering said ring until said starvation transaction safely exits said ring.

10. The method according to claim 7, further comprising clearing the current injected candidate transaction if said current injected candidate transaction ceases to be a starved transaction.

11. The method according to claim 7, further comprising clearing the current injected candidate transaction and sampling a next candidate transaction in round robin fashion if after N-stages said injected candidate transaction has not reached said sampling point.

12. The method according to claim 7, further comprising continuing to sample and monitor injected candidate transactions m said ring in round robin fashion until all starving transactions are detected or a starved transaction is identified and the blocking is activated thus clearing all transactions from the ring.

13. An apparatus for preventing livelock for use in an N-stage ring-shaped interconnect, comprising:
- a means for injecting one or more transactions into said ring;
- a sampler operative to sample a single injected candidate transaction at a sample point in said ring after it has looped at least once around said ring;
- defining a starvation transaction as an injected transaction that has looped a predetermined threshold of times around the ring; and
- a flagging circuit operative to flag said injected candidate transaction as a starvation transaction if said injected candidate transaction continues to loop around said ring meeting the predeterminted threshold.

14. The apparatus according to claim 13, further comprising means for activating a livelock handling procedure if said injected candidate transaction continues to loop around said ring at least meeting the predetermined threshold at said sampling point.

15. The apparatus according to claim 14, wherein said means for activating a livelock handling procedure comprises means for blocking transactions from entering said ring until said starvation transaction safely exits said ring.

16. The apparatus according to claim 13, further comprising means for clearing the current injected candidate transaction and sampling a next candidate transaction in round robin fashion if said current injected candidate transaction ceases to be a starved transaction.

17. The apparatus according to claim 13, further comprising means for clearing the current injected candidate transaction and sampling a next candidate transaction in round robin fashion if after N-stages said injected candidate transaction has not reached said sampling point.

18. The apparatus according to claim 13, further comprising means for continuing to sample injected candidate transactions in said ring in round robin fashion until all starving transactions are detected.

19. An apparatus for preventing livelock for use in an N-stage ring-shaped interconnect, comprising:
- a means for injecting one or more transactions into said ring;
- a sampler operative to sample a single injected candidate transaction in said ring;
- a monitor operative to monitor said injected candidate transaction for recurring looping thereof at a sampling point;
- a flagging circuit operative to flag said injected candidate transaction as a starvation transaction, wherein a starvation transaction is defined as an injected transaction that has looped a predetermined threshold of times around the ring; and
- a release circuit operative to otherwise release said injected candidate transaction if it reaches its target before looping around said ring said configurable number of times and to sample a next candidate transaction in said ring in round robin fashion.

20. The apparatus according to claim 19, further comprising means for activating a livelock handling procedure if said injected candidate transaction continues to loop around said ring at least meeting the predetermined threshold at said sampling point.

21. The apparatus according to claim 20, wherein said means for activating a livelock handling procedure comprises means for blocking transactions from entering said ring until said starvation transaction safely exits said ring.

22. The apparatus according to claim 19, further comprising means for clearing the current injected candidate transaction if said current injected candidate transaction ceases to be a starved transaction.

23. The apparatus according to claim 19, further comprising means for clearing the current injected candidate transaction and sampling a next candidate transaction in round robin fashion if after N-stages said injected candidate transaction has not reached said sampling point.

24. The apparatus according to claim 19, further comprising means for continuing to sample and monitor injected candidate transactions in said ring in round robin fashion until all starving transactions are detected.

* * * * *